United States Patent

Winslow

Patent Number: 5,555,336
Date of Patent: Sep. 10, 1996

[54] FIBER OPTIC OWER DISTRIBUTION

[75] Inventor: David T. Winslow, Los Angeles, Calif.

[73] Assignee: Hughes Aircraft Company, Los Angeles, Calif.

[21] Appl. No.: 364,868

[22] Filed: Dec. 27, 1994

[51] Int. Cl.$^6$ ........................... G02B 6/44
[52] U.S. Cl. ........................... 385/101; 385/128
[58] Field of Search ............... 385/128, 127, 385/101, 168, 84, 66, 67, 126

[56] References Cited

U.S. PATENT DOCUMENTS 4,896,939  1/1990  O'Brien .................. 385/101

FOREIGN PATENT DOCUMENTS

W8201365  4/1982  WIPO .................. 385/127

OTHER PUBLICATIONS

Imai et al; Optics Letters/vol. 13, No. 10/Oct. 1988; pp. 838–840.

*Primary Examiner*—John Ngo
*Attorney, Agent, or Firm*—Leonard A. Alkov; Wanda K. Denson-Low

[57] ABSTRACT

A fiber optic assembly including an elongated light guiding optical fiber strand, a first conductive layer coated around the elongated light guiding optical fiber strand, an elongated glass capillary surrounding the elongated light conveying optical fiber strand and the conductive coating disposed therearound, and a second conductive layer coated around the elongated glass capillary.

2 Claims, 1 Drawing Sheet

FIBER OPTIC OWER DISTRIBUTION

BACKGROUND OF THE INVENTION

The subject invention is generally directed to fiber optic structures, and more particularly to a fiber optic assembly that distributes electrical power.

Fiber optic structures are being utilized for transmission of information carrying optical signals, since they provide for high speed transmission without electromagnetic interference (EMI). However, electrical power such as bias power for electrical circuits cannot be efficiently distributed in optical form (e.g., about 15% efficiency), and thus electrical power is commonly distributed by a structure that is distinct from an accompanying fiber optic structure. In other words, two separate systems are commonly utilized to distribute information carrying signals and electrical power in applications wherein fiber optic structures are utilized for distributing the information carrying signals.

SUMMARY OF THE INVENTION

It would therefore be an advantage to provide a fiber optic assembly that distributes information carrying optical signals as well as electrical power.

The foregoing and other advantages are provided by the invention in a fiber optic assembly that includes a light guiding optical fiber strand, a first conductive layer coated around the light guiding optical fiber strand, an elongated glass capillary surrounding the light conveying optical fiber strand and the conductive coating disposed therearound, and a second conductive layer coated around the elongated glass capillary, whereby optical signals are propagated by the optical fiber strand and electrical power is distributed via the conductive coatings.

BRIEF DESCRIPTION OF THE DRAWINGS

The advantages and features of the disclosed invention will readily be appreciated by persons skilled in the art from the following detailed description when read in conjunction with the drawing wherein.

DETAILED DESCRIPTION OF THE DISCLOSURE

Figure 1:
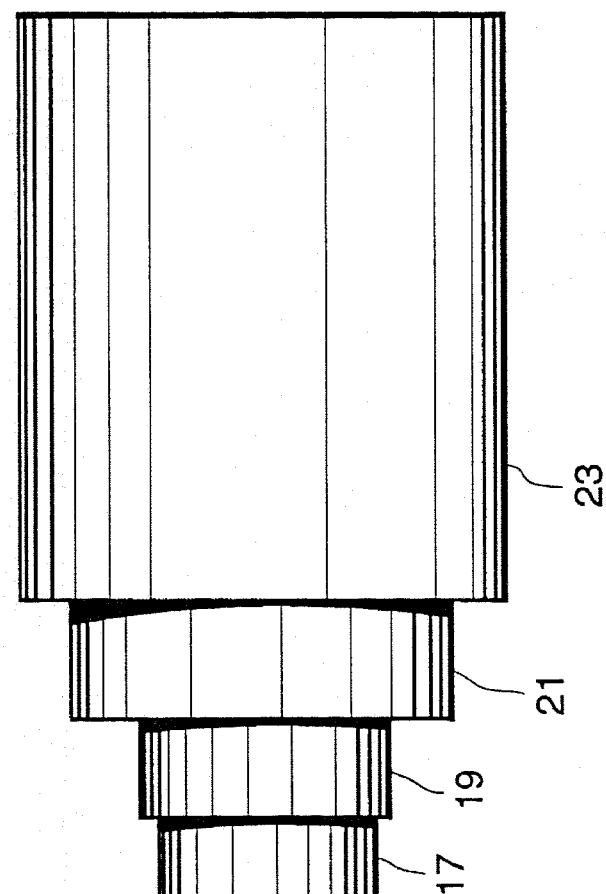
FIG. 1 sets forth a partially broken away view of a fiber optic assembly in accordance with the invention.

In the following detailed description and in the several figures of the drawing, like elements are identified with like reference numerals.

Figure 2:
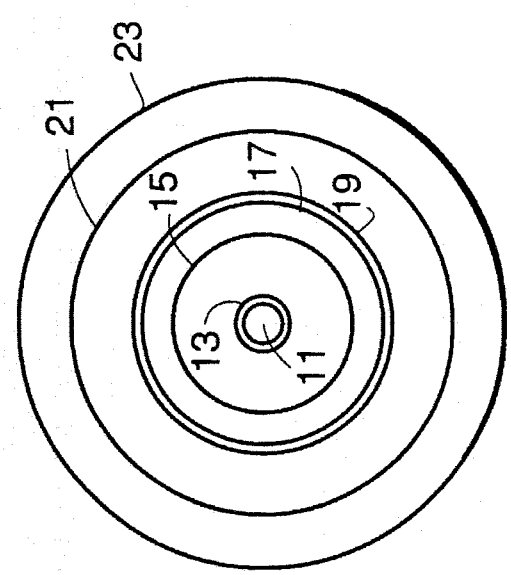
FIG. 2 sets forth a transverse sectional view of the fiber optic assembly of FIG. 1.

Referring now to FIGS. 1 and 2, set forth therein are a partially broken away elevational view and a transverse sectional view of a fiber optic assembly in accordance with the invention. The fiber optic assembly includes an elongated light guiding optical fiber strand 11 having a circular cross-section or an elliptical cross section, for example, and a metallic conductive layer 13 that is coated on the outside surface of the optical fiber 11 strand. The optical fiber strand 11 can be of conventional manufacture and material, and must be capable of being coated with the metallic conductive layer. By way of illustrative example, the metallic conductive layer 13 comprises aluminum, and is coated onto the optical fiber strand 11 by an appropriate procedure such as sputtering.

The optical fiber strand 11 and the conductive layer 13 are contained in an elongated glass capillary 17 together with a viscous bonding material 15 that is disposed between the outside surface of the metallic coating 13 and the inside surface of the glass capillary 17. The viscous bonding material 15 is of a conventional material such as a silicone RTV (room temperature vulcanizing) sealant, and provides for strain relief between the optical fiber strand 11, as coated with the conductive layer 13, and the glass capillary 17. By way of illustrative example, the viscous bonding material is injected in a conventional manner between the conductive layer 11 and the inside surface of the glass capillary 17 as the optical fiber strand 11 and the conductive layer 13 are inserted into the glass capillary 17 by conventional techniques. A further conductive metallic layer 19 is coated on the outside surface of the glass capillary 17, and a buffer structure 21 is disposed over the conductive metallic layer 19. By way of illustrative example, the conductive metallic layer 19 comprises aluminum which is coated onto the glass capillary 17 by an appropriate procedure such as sputtering. The buffer structure 21 is of a conventional structure such as a silicone buffer coated over the metallic layer 19 and an ethylene-tetrafluoroethylene buffer coated over the silicone buffer. Protective jacketing 23 in accordance with conventional techniques can be disposed over the buffer structure 21 as required for the particular application in which the optical fiber assembly is utilized.

In accordance with the invention, information carrying optical signals are propagated by the optical fiber strand 11 while electrical power such as circuit bias power is conducted by the conductive metallic layers 13, 19.

The foregoing has been a disclosure of a fiber optic assembly that advantageously provides for distribution of electrical power and reduces the need for separate structures for distributing electrical power in fiber optic systems.

Although the foregoing has been a description and illustration of specific embodiments of the invention, various modifications and changes thereto can be made by persons skilled in the art without departing from the scope and spirit of the invention as defined by the following claims.

What is claimed is:

1. A fiber optic assembly, comprising:

a light guiding optical fiber strand;

a first metal layer with an outside surface coated around said elongated light guiding optical fiber strand;

an elongated glass capillary with an inside surface surrounding said light conveying optical fiber strand and said first metal layer coating disposed therearound;

viscous boding material disposed between the outside surface of said first metal layer and the inside surface of said elongated glass capillary; and a second metal layer coated around said elongated glass capillary, said first metal layer and said second metal layer for conducting electrical power.

2. The optical fiber assembly of claim 1 wherein said first conductive layer comprises aluminum, and said second conductive layer comprises aluminum.

\* \* \* \* \*